(12) United States Patent
Yao et al.

(10) Patent No.: US 10,805,257 B2
(45) Date of Patent: Oct. 13, 2020

(54) UNIFIED MESSAGING SYSTEM WITH INTEGRATION OF CALL LOG DATA

(71) Applicant: Facebook, Inc., Menlo Park, CA (US)

(72) Inventors: Rose Yao, San Francisco, CA (US); Brandon Marshall Walkin, San Francisco, CA (US)

(73) Assignee: Facebook, Inc., Menlo Park, CA (US)

( * ) Notice: Subject to any disclaimer, the term of this patent is extended or adjusted under 35 U.S.C. 154(b) by 421 days.

(21) Appl. No.: 14/146,551

(22) Filed: Jan. 2, 2014

(65) Prior Publication Data

US 2014/0122628 A1 May 1, 2014

Related U.S. Application Data (63) Continuation of application No. 13/214,924, filed on Aug. 22, 2011, now abandoned.

(51) Int. Cl.

| | |
|---|---|
| *H04L 12/58* | (2006.01) |
| *G06Q 10/10* | (2012.01) |
| *G06Q 50/00* | (2012.01) |
| *H04M 7/00* | (2006.01) |
| *H04M 3/42* | (2006.01) |

(52) U.S. Cl.
CPC .......... *H04L 51/38* (2013.01); *G06Q 10/101* (2013.01); *G06Q 50/01* (2013.01); *H04L 51/04* (2013.01); *H04L 51/16* (2013.01); *H04L 51/32* (2013.01); *H04L 51/36* (2013.01); *H04M 7/0042* (2013.01); *H04M 3/42382* (2013.01); *H04M 2201/40* (2013.01); *H04M 2201/60* (2013.01); *H04M 2203/655* (2013.01)

(58) Field of Classification Search
CPC ... G06F 17/30867; G06F 3/048; G06Q 50/01; H04L 51/16; H04L 51/32; H04L 51/04–046; H04L 51/36; H04M 2203/655; H04M 1/72522–72561
See application file for complete search history.

(56) References Cited

U.S. PATENT DOCUMENTS

| | | | | |
|---|---|---|---|---|
| 2005/0267973 | A1* | 12/2005 | Carlson | G06Q 30/06 709/228 |
| 2007/0135099 | A1* | 6/2007 | Taylor | G06F 17/3089 455/412.1 |
| 2007/0174388 | A1* | 7/2007 | Williams | G06Q 10/107 709/204 |
| 2009/0031245 | A1* | 1/2009 | Brezina | H04M 15/00 715/781 |
| 2009/0268716 | A1* | 10/2009 | Lamb | H04L 51/34 370/352 |

(Continued)

*Primary Examiner* — Liang Y Li (74) *Attorney, Agent, or Firm* — Baker Botts L.L.P.

(57) ABSTRACT

In particular embodiments, a mobile computing device receives an incoming communication from a source. The mobile computing device queries a social-networking system operable to aggregate communications between the source and a user associated with the mobile computing device. The mobile computing device receives from the social-networking system one or more aggregated communications between the source and the user and at least a portion of a profile associated with the source in the social-networking system. The mobile computing device displays the aggregated communications and the portion of the profile in a screen of the mobile computing device.

20 Claims, 5 Drawing Sheets

(56) References Cited

U.S. PATENT DOCUMENTS

| | | | |
|---|---|---|---|
| 2011/0021250 A1* | 1/2011 | Ickman | G06F 17/30867 455/566 |
| 2011/0197163 A1* | 8/2011 | Jegal | G06F 3/0482 715/811 |
| 2012/0036200 A1* | 2/2012 | Cole | H04L 51/32 709/206 |
| 2012/0278329 A1* | 11/2012 | Borggaard | G06F 17/30699 707/738 |
| 2012/0278732 A1* | 11/2012 | Lee | H04L 51/14 715/752 |

* cited by examiner

UNIFIED MESSAGING SYSTEM WITH INTEGRATION OF CALL LOG DATA

PRIORITY

The application is a continuation under 35 U.S.C. § 120 of U.S. patent application Ser. No. 13/214,924, filed 22 Aug. 2011, which is incorporated herein by reference.

TECHNICAL FIELD

The present disclosure relates generally to integration of multiple communication protocols between a user and a plurality of contacts into a single conversation view for each of the plurality of contacts, and, in particular, integrating the conversations view with interactions and communications on a social networking system.

BACKGROUND

The advent of social networking, instant messaging, and ubiquitous wireless data networks allows individuals to select from a plurality of methods to communicate with their contacts. In the past, communications between individuals were limited to physical mail, wired telephones, fax, and wireless telephones. However, with the expansion of the Internet, coupled with mobile devices capable of maintaining a data connection to the Internet, users may select from a plethora of communications means, such as: cellular phone calls, e-mail to multiple accounts, multiple instant messaging protocols, twitter messages, voice-over-IP (VoIP) calls, video chats, SMS and MMS messages, social networking messages, voicemail, push-to-talk (PTT), and dedicated notification-based message clients such as the Blackberry Messenger and Kik Messenger. Typically, users are less concerned by the actual communications method used with their contacts, and more concerned with the content of the communication and to or from whom it was conveyed.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION OF EXAMPLE EMBODIMENT(S)

Overview

Particular embodiments relate to a "conversations view" presented to the user of a computing device. The conversations view aggregates all interactions between a particular user and one of his contacts over all communications media, and presents the history of the conversation in a single temporally-arranged thread.

Implementations of the present invention extend these concepts by allowing an application, whether local to the user's device or residing at a server hosted by a social networking site, to synchronize all the user's actions on the social networking site with the local application, or all the user's device-local communications with the application residing on the social networking site. Thus the application provides a fully integrated conversation log of any communication between the user and one or more contacts.

Figure 1:
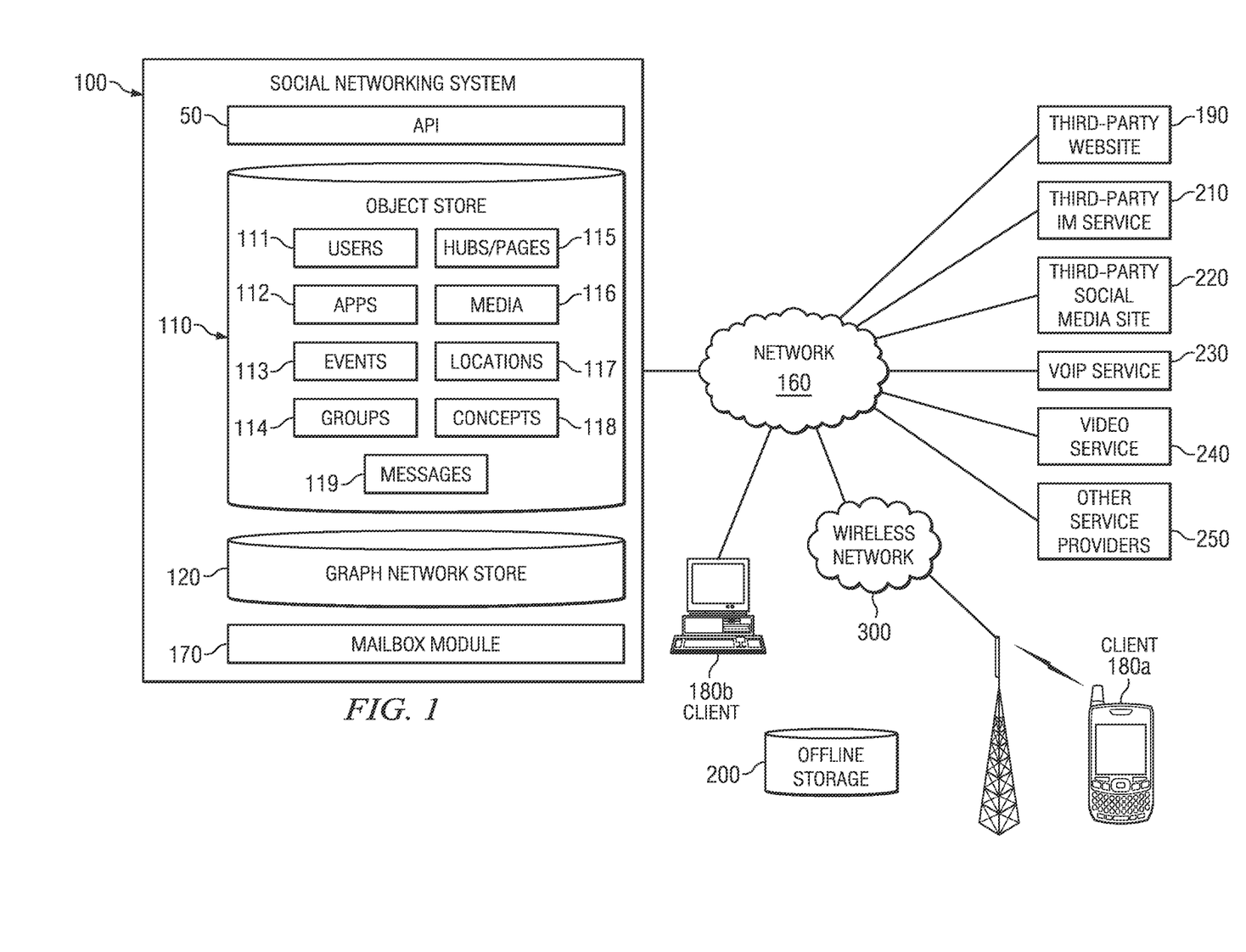
FIG. 1 illustrates an example social networking environment.

FIG. 1 is a high-level block diagram of an integrated messaging system according to one embodiment. FIG. 1 illustrates a social networking system 100, client devices 180a and 180b, wireless cellular network 300, third-party website 190, third-party IM service 210, third-party social media site 220, VoIP service 230, Video Service 240, and other third-arty services providers 250. FIG. 1 also includes offline storage 200 that is local to client devices 180a and 180b. Client devices 180a and 180b are depicted as a mobile phone 180a and desktop computer 180b, but client devices 180 may comprise any type of computing device, including mobile phone, laptop, netbook tablet, cable box, television, etc. The distinction between 180a and 180b is merely that client device 180a connects to network 170 through a wireless cellular network 300, such as GPRS-based and CDMA-based wireless networks, as well as 802.16 WiMax and long-range wireless data networks. Client devices 180a and 180b have memories capable of storing call, text, and other messaging data, depicted in FIG. 1 as offline storage 200. For the purposes of this disclosure, "client device 180" includes both client devices 180a and 180b.

Client devices 180a and 180b interact with external websites 190 and other service providers 210, 220, 230, 240, and 250 through a web browser residing on the client device, or a dedicated application local to client devices 180a and 180b. For example, client devices 180a and 180b may interact with third-party instant messaging service 210, such as Google Chat, by visiting and logging into their Gmail account via a web browser, or by installing and running a dedicated Google Talk application. Similarly, client devices 180a and 180b may interact with a third-party social media site, such as Twitter, via a browser or through a dedicated Twitter application. The same follows for VoIP service 230, such as Skype, Video service 240, such as FaceTime or Tango, and other service providers 250. Other service providers 250 may include, but is not limited to, e-mail servers, other social-networking websites, shopping sites, review sites such as Yelp!, and any third-party website on which a user maintains an account to interact with content or other users. This disclosure contemplates any type of third-party service provider 250 connected to network 170.

A user of the client devices 180a and 180b interacts with the social networking system 100 via an application, such as a web browser or a native application, to perform operations such as browsing content, posting and sending messages, retrieving and sorting messages received from other users, and the like. Messages can be in any electronic message format such as electronic mail ("e-mail") messages, chat messages, comments left on a user's webpage, and short message service (SMS) text messages. Messages can contain plain text, or they can contain other content such as pictures, videos, and attachments. Each user has a mailbox that includes messages that are both sent and received by the user.

Client device 180a, connected through wireless network 300, may also interact with other client devices through the circuit-switched, or non-data, portion of wireless network 300. For example, a user at client device 180a may transmit and receive a non-VoIP call to a cellular phone or landline, transmit and receive a text or multi-media message through the SMS or MMS channels, or receive push notifications through the SMS control channel.

Additionally, the third party website 190 can also interact with the social networking system 100 via a system-provided application programming interface (API) 150. For example, the third party website can perform operations supported by the API, such as delivering messages to the social network system 100, retrieving messages stored by the social networking system 100, and obtaining social information about users of the social networking system 100.

The social networking system 100 comprises an object store 110, a graph information store 120, and a mailbox module 170. The object store 110 stores information on objects, such as users, represented in or by the social networking environment 100. The graph information store 120 stores information on the relationships of the objects in the object store 110. The mailbox module 170 provides functionality for powering the messaging system.

In one embodiment, the mailbox module 170 receives, organizes, and presents messages to/from users in the social networking system 100 via an interactive user interface. The user interface can be, for example, a webpage that is viewed by a user with a web browser. The interactive user interface may be an application residing on the user's computing device 180a or 180b. In particular embodiments, the interactive user interface may be a combination of server and client side rendering, depending on processing and bandwidth capacity. The functionality provided by the mailbox module 170 includes organizing messages into conversations, quick reply, categorizing conversations, conversation states, conversation searching, new message notification, formatting of e-mails, forwarding messages between conversations, and invitation based conversion, among others. In particular embodiments, messages occurring off the social network are synchronized with mailbox module 170 when the client devices 180a and 180b perform a synchronize operation. In particular embodiments, all data-related messages or communications, i.e., communications requiring interaction with network-connected entities 190 and 210-250 are pulled automatically through one or more APIs 50 and stored at mailbox module 170. In particular embodiments, a mixture of client-push and server-pulls are used to aggregate all communications at mailbox module 170. In particular embodiments, a local application on client devices 180a and 180b performs the operations of mailbox module 170 and pulls data from social network 100 and third-party entities 190 and 210-250 to mobile device 180.

Figure 4:
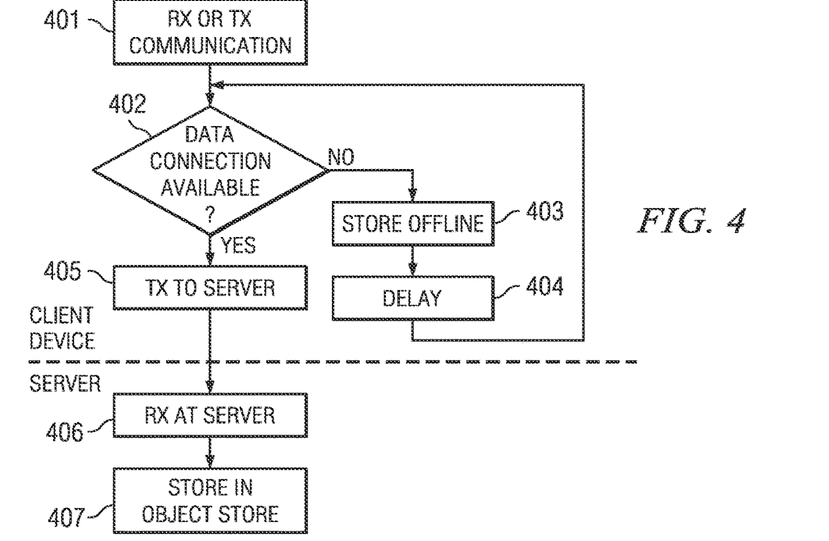
FIG. 4 illustrates an example method of synchronizing offline conversation data with a social networking system.

FIG. 4 is a flowchart illustrating an example method of aggregating all the messages in mailbox module 170. At step 401, mobile device 180a or 180b transmits or receives a communication. The communication, as described above, can be over a data network, voice network, or SMS channels. The communication may be a voice call, instant message, email, SMS or MMS message, PTT message, VoIP session, video call, voicemail, message from a social media or third-party social networking site (twitter, dating web sites, web forums with private messages, etc.). Typically, where the communication does not contain any text, such as in a voice call, VoIP session, PTT message, voicemail, or video chat, client device 180 generates log data after the communication session has completed. Typically the log file includes an identification of the other parties, the time and duration of the communication session, whether it was an incoming, outgoing, or missed communication, and the like. In particular embodiments, voice transcription software converts the message into text, in particular, received half-duplex communications such as PTT messages and voicemails, although transcription of full-duplex voice calls and video chats is also contemplated.

At step 402, the client device 180a or 180b checks whether a data connection is available. This is more pertinent to client devices of type 180a connected to network 170 through a wireless cellular network 300. Often, mobile devices have limited data coverage due to interference or poor cellular reception. Thus, it is not always possible to connect to social networking system 100 via wireless cellular network 300 and network 170. Although less of an issue for client device 180b, it is conceivable that a connection to network 170 is not immediately available, as well.

In the case a data connection is unavailable, in Step 403 client devices 180a and 180b store a copy of the message, or a copy of the text transcribed from a communication lacking text, or the log data for a communication lacking text, in an offline storage. Offline storage is typically the memory of client device 180 itself, but this disclosure contemplates any storage means accessible by client 180.

At Step 404, client device 180 waits until a data connection is available. In particular embodiments, client device 180 waits a predetermined period of time before checking for a data connection. In particular embodiments, an application residing on client device 180 monitors the connection between client device 180a and wireless cellular network 300 and notifies other applications when a data connection is available.

At Step 405, after detecting a data connection, client device 180 transmits the message, text transcribed from a communication lacking text, or log data for a communication lacking text to social networking system 100 via network 170. Client device 180 may connect to social networking system 100 via a dedicated API, or though standard web protocols. In particular embodiments, only a portion of messages containing text, such as emails, are transmitted in order to save bandwidth and battery life.

At Step 406, social networking system 100 receives the communication, and in Step 407, stores it in the object store 110 to be managed by mailbox module 170. As stated earlier, the communication transmitted or received in Step 401 may be of any suitable type, and utilize either the packet-switched data network of wireless cellular network 300, the circuit-switched (voice) channels of wireless cellular network 300, or the SMS channel of wireless cellular network 300. In particular embodiments, all data transmissions utilizing the packet-switched data network are pulled from their respective third-party servers via mailbox module 170. For example, the mailbox module 170 could periodically transmit a request to a user's Yahoo! mail server, providing authentication credentials for the user, and pull new mail to mailbox 170 before transmitting it to the user's client device 180. In particular embodiments, mailbox module 170 acts as a messaging gateway through which all data messages pass.

In one embodiment, the mailbox module 170 aggregates messages into "conversations." Each conversation includes messages associated with a set of users ("participants") and includes all messages sent between users in the set. For example, assume that Adam is a user of social networking system 100 and Bob is one of his contacts. If Adam sends communicates with Bob, the message creates a new conversation associated with Adam and Bob. Each time Adam communicates with Bob, that new communication (whether the message itself, transcribed text, or log data) is added to the existing conversation. A conversation thus becomes a historical record of all correspondence between a set of users.

A set of users can include two or more users. For example, if Adam sends an e-mail message to Bob and copies Charles, this message creates a new three-way conversation between Adam, Bob, and Charles. This three-way conversation is distinct from the one on one conversation between Adam and Bob that was created in the prior example. In other words, communications in the Adam-Bob conversation are not included in the Adam-Bob-Charles conversation, and vice versa.

Figure 2:
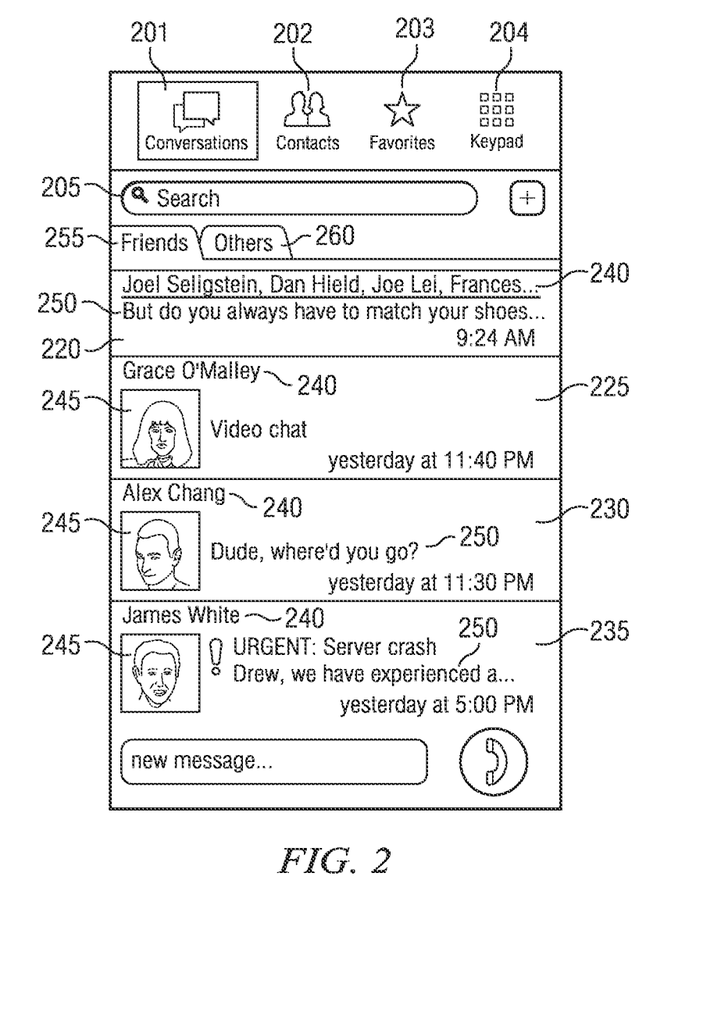
FIG. 2 illustrates an example interface implementing a conversations view.

FIG. 2 illustrates a list of conversations according to an embodiment. Shown is an interface for browsing the conversations for a user named Drew Hamlin 205. Drew has selected to view his communications by launching the a dedicated conversations application, or accessing a link on a web page of social networking system 100. For didactic purposes, FIG. 2 illustrates the interface of a dedicated application, such as on a touchscreen-operated mobile phone. In particular embodiments, the interface includes an option for selecting the conversations view 201, an option for browsing a list of contacts 202, and option to browse contacts marked as favorites 203, and an option to launch the keypad 204. In particular embodiments, the interface also includes a search bar 205, which allows the user to search both contact names and the content of conversations.

Upon selecting the conversations button 201, the application opens a list of conversations 220-235, arranged in this example, temporally with the most recently active conversation first. The conversations are separated into two tabs, "friends" 255 and "others" 260. Friends tab 255 displays conversations with contacts that are also members of social network 100. Others tab 266 displays conversations with participants who are not members of social network 100. For example, Drew Hamlin may have a contact stored as "Mom" in their client device 180 that does not correspond to a user on social network 100. The conversation between Drew and his mom will be displayed in others tab 260. As another example, Drew may receive a call from a telemarketer dialing from 650-555-5555, who is neither a member of social network 100 nor a stored contact of Drew's. However, because call log data is generated for this incoming call, the conversation between Drew and 650-555-5555 will be displayed in others tab 260.

The first conversation 220 represents a conversation between six users (all members of social network 100)— Drew Hamlin, Joel Seligstein, Dan Hsiao, Will Bailey, and 2 others. Conversations 225, 230, and 235 represent conversations with individual contacts, in these examples, Grace O'Malley, Alex Chang, and James White.

For each conversation, a brief summary of the conversation is presented in the interface. In one embodiment, the summary includes the names 240 of the conversation participants, pictures 245 of the conversation participants, and an excerpt 250 from the most recent message in the conversation. In one embodiment, conversations including multiple participants do not have pictures 245 to save space. The summaries are organized by time/date so that conversations with the most recent messages are placed higher in the interface. The name and/or picture of the user that the mailbox belongs to (the "mailbox owner") is not displayed in the summary because it is understood that the mailbox only includes conversations in which the mailbox owner is a participant. In this figure, Drew Hamlin 205 is the mailbox owner, so his name/picture are not shown in the summaries.

When a conversation has a large number of participants, in one embodiment only a sub-set of the names are presented to simplify the summary. The sub-set can be any number of participants from the conversation. For example, conversation 220 has six participants. In one embodiment, only the names of a sub-set of conversation participants are displayed. The name of the mailbox owner is not shown in the summary. The names of the other participants are grouped together and presented as "2 others." The mailbox module 170 can select the sub-set of names in any of a number of ways. For example, the sub-set may include the names of the participants who created the most recent messages in the conversation, the name of the participant who started the conversation, or the names of the participants that the mailbox owner has the strongest affinity for or social relationship with.

In one embodiment, the brief excerpt 250 may be extracted from the content of the most recent message in the conversation. For example, in conversation 220, the excerpt 240 includes the text "But do you always have to match your shoes . . . " which is the most recent message from this conversation 220. In other embodiments, the brief excerpt is extracted from other information that is not message content, such as metadata associated with the message. For example, the brief excerpt could be the title of the most recent e-mail message in the conversation.

Users are objects in the social networking system. Object store 110 includes a profile for each user that comprises a profile name, an e-mail address, a profile picture, and other identifying information. In one embodiment, the name of a participant as displayed in the summary is identified from the participant's profile. For example, an e-mail received from Dan.Hsiao@yahoo.com can be identified from information in the object store 110 as being an e-mail from the user Dan Hsiao. For example, conversation 225 between Drew Hamlin and Grace O'Malley includes a video chat taking place at 11:40 PM the previous day. In particular embodiments, video chat is facilitated through third-party video service 240, such as Tango. Each Tango user has a specific user ID. Thus when Drew has a video call between his Tango account and Grace O'Malley's Tango account, the application automatically identifies Grace O'Malley's Tango account as social network 100 user Grace O'Malley from information stored in object store 110.

In one embodiment, the mailbox module 170 aggregates messages of different formats (e-mail, SMS text, instant message) and communication protocols (voice, VoIP, video, etc.) into conversations. Each conversation thus becomes a historical record of all correspondence between a set of users regardless of the format of the messages or log data. For example, if Adam sends an online instant message to Bob and also separately sends an e-mail to Bob, both of these messages are placed into the same conversation. Similarly, if Bob leaves Adam a voicemail, an indicator of the voicemail (such as the date and time it was left), or, alternatively, transcribed text from the voicemail, will be placed into the conversation. As another example, if Adam calls Bob, the log of the call will be placed in the conversation as well.

As an example, conversation 245 between Drew Hamlin and Alex Chang includes a summary of the last communication, the text string "Dude, where'd you go?", received the previous night at 11:30 PM. Whether this communication is a text message, e-mail, instant message, direct message from match.com, re-tweet or direct message on twitter, or voicemail is less relevant, at first glance, to Drew Hamlin compared to the actual content of the message and when it was received. Thus the conversations window groups all communications, irrespective of format or protocol, in a single history for each of the user's real-world contacts.

To accomplish this, for each message or log data received by mailbox module 170 in Step 406, the mailbox module 170 identifies the sender and recipient of the message by comparing identifiers for the message to information in a social networking database. Once the sender and recipient are identified, the message is placed into the appropriate conversation that is associated with these two users.

Figure 3:
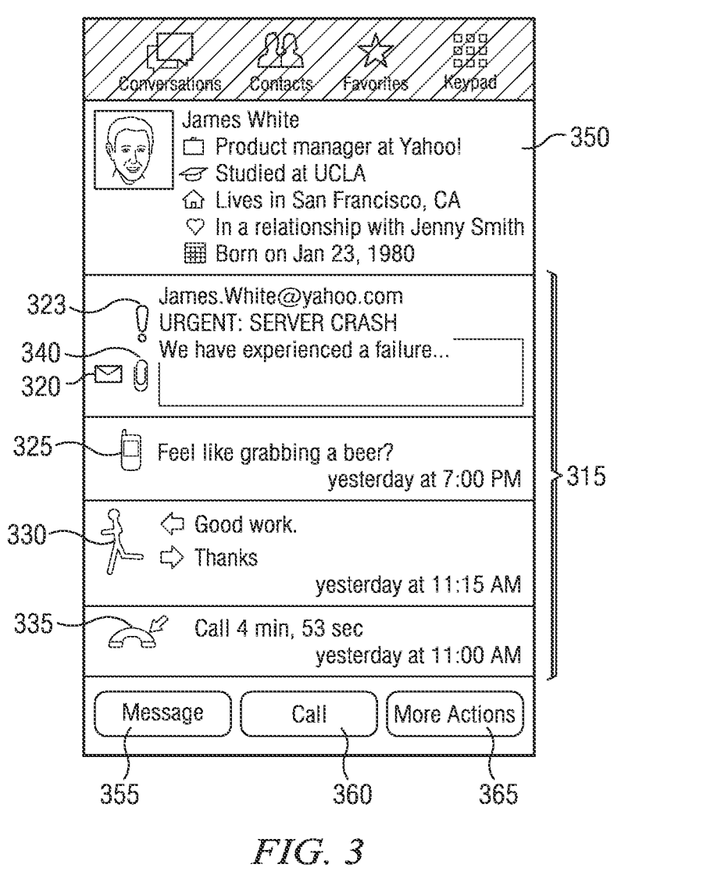
FIG. 3 illustrates an example interface for viewing a particular conversation

FIG. 3 illustrates a conversation that aggregates different message formats according to an embodiment. The user can reach this display by selecting one of the conversations in the interface of FIG. 2. Optionally, information pulled from user store 111 may populate an information panel 350 for a user. In particular embodiments, the interface includes buttons to message 355, via a default messaging protocol (for example, SMS to the contact's primary phone number), and call 360, via a primary phone number, the contact. In particular embodiments, the more actions button 365 launches a sub-menu with various other methods of communicating with the contact, such as e-mail addresses, alternative phone numbers, IM handles, etc.

Shown is a one on one conversation between user Drew Hamlin and James White that comprises of a series of messages 315 of different formats. Icons within each message indicate the format that the message was delivered in. Icon 320 indicates that the first message is an e-mail. Icon 325 indicates the e-mail was marked by James as "urgent." Icon 340 is an icon of a paperclip, representing that the email includes an attachment. Icon 325 indicates that the second message is a text message sent from a phone. Icon 330 indicates that the third group of messages are instant messages, in particular from the American Online Instant Messenger (AIM) service. Icon 335 indicates that there was an incoming phone call from James White, and the entry associated with icon 335 indicates that the call was received yesterday at 11:00 AM and lasted 4 minutes, 53 seconds.

The conversation can be updated live as new messages are received that update the conversation. As discussed above, a conversation is akin to a historical record of all correspondence between a set of users. Through the interface, a mailbox owner can scroll backwards in time to view the entire history of the messages in the conversation. In one embodiment, some of the messages can have attachments such as pictures, videos, documents, etc. The pictures and video can be shown in the interface with a preview of the attachment instead of just a link to the attachment. For example, an attached picture can be shown in the interface with a thumbnail of the picture. For the mailbox owner, the conversation appears to include both outgoing and incoming messages and log data.

In one embodiment, conversations that have more than two participants behave like chat rooms. A conversation participant can send a message to the conversation, which is then distributed by the mailbox module 170 to all conversation participants. In particular embodiments, conference calling, multi-participant VoiP sessions, and multi-participant video chat sessions are represented as chat rooms using log data in lieu of messages.

In one embodiment, the mailbox module 170 may arrange conversations based on importance rather than temporally. By default, the system determines the placement for a conversation based on a number of factors. These factors include, but are not limited to:

The nature of a social relationship between a mailbox owner and an object that is linked to the messages in the conversation. This includes a social relationship (e.g., friends, friends of friends, liking a page) between the mailbox owner and any of the participants in the conversation.

Whether the e-mail is signed, such as through Sender Policy Framework (SPF) or Domain Keys Identified Mail (DKIM).

Whether any messages in the conversation contain a known virus.

Whether any messages in the conversation contain known spam.

Whether the conversation is initiated by a sender with a bad reputation (e.g., have other users blocked the sender?).

Whether the conversation is initiated by an object (e.g., user, page, event, or group) of the social networking system 100.

Whether the conversation includes messages with attachments.

Whether the conversation is initiated by an e-mail address that the mailbox owner has white-listed or black-listed.

Mailbox module 170 may also adjust the importance of a conversation based on the degree of "closeness" between the mailbox owner and the conversation participant or participants. For example, two users who frequently exchange communications may indicate that messages from the frequently engaged user is more important than a message from a less-frequently engaged user. In particular embodiments, users who interact on the social network (through pokes, likes, comments, etc.) more frequently are deemed to be more important. In particular embodiments, users who have longer communication duration (such as calls, video, etc.) are deemed to be more important. In particular embodiments, the user may specify groups, such as "family", "work", and the like, and rank the groups' relative importance.

Figure 5:
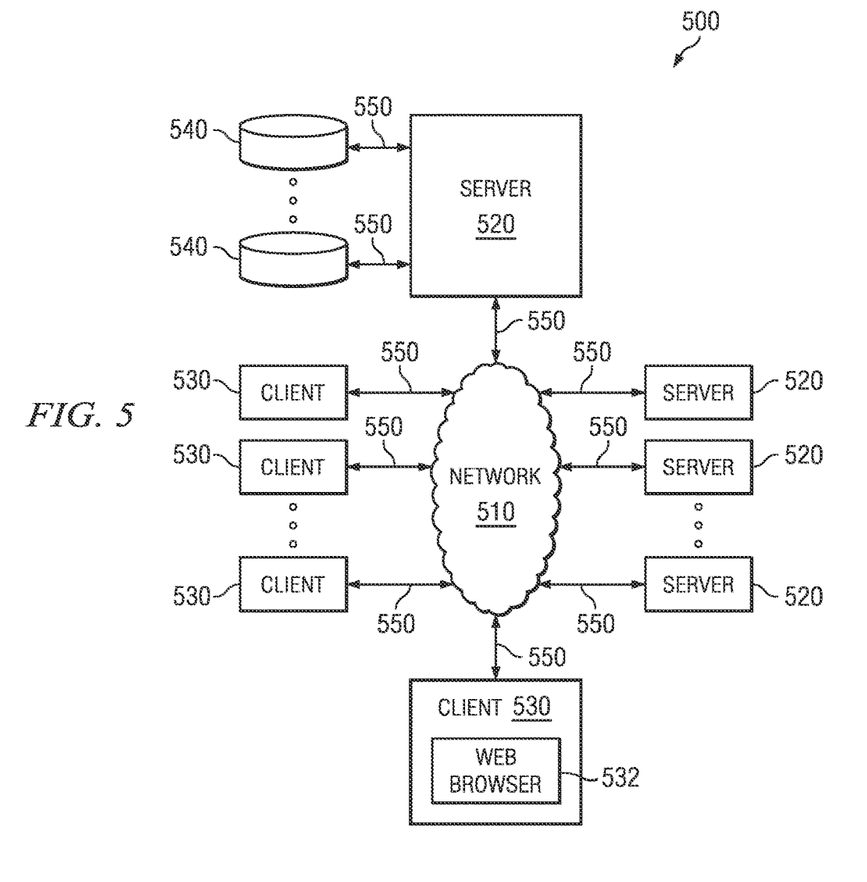
FIG. 5 illustrates an example network environment

While the foregoing embodiments may be implemented in a variety of network configurations, the following illustrates an example network environment for didactic, and not limiting, purposes. FIG. 5 illustrates an example network environment 500. Network environment 500 includes a network 510 coupling one or more servers 520 and one or more clients 530 to each other. Network environment 500 also includes one or more data storage 540 linked to one or more servers 520. Particular embodiments may be implemented in network environment 500. For example, social networking system frontend 120 may be written in software programs hosted by one or more servers 520. For example, event database 102 may be stored in one or more storage 540. In particular embodiments, network 510 is an intranet, an extranet, a virtual private network (VPN), a local area network (LAN), a wireless LAN (WLAN), a wide area network (WAN), a metropolitan area network (MAN), a portion of the Internet, or another network 510 or a combination of two or more such networks 510. The present disclosure contemplates any suitable network 510.

One or more links 550 couple a server 520 or a client 530 to network 510. In particular embodiments, one or more links 550 each includes one or more wired, wireless, or optical links 550. In particular embodiments, one or more links 550 each includes an intranet, an extranet, a VPN, a LAN, a WLAN, a WAN, a MAN, a portion of the Internet, or another link 550 or a combination of two or more such links 550. The present disclosure contemplates any suitable links 550 coupling servers 520 and clients 530 to network 510.

In particular embodiments, each server 520 may be a unitary server or may be a distributed server spanning multiple computers or multiple datacenters. Servers 520 may be of various types, such as, for example and without limitation, web server, news server, mail server, message server, advertising server, file server, application server, exchange server, database server, or proxy server. In particular embodiments, each server 520 may include hardware, software, or embedded logic components or a combination of two or more such components for carrying out the appropriate functionalities implemented or supported by server 520. For example, a web server is generally capable of hosting websites containing web pages or particular elements of web pages. More specifically, a web server may host HTML files or other file types, or may dynamically create or constitute files upon a request, and communicate them to clients 530 in response to HTTP or other requests from clients 530. A mail server is generally capable of providing electronic mail services to various clients 530. A database server is generally capable of providing an interface for managing data stored in one or more data stores.

In particular embodiments, one or more data storages 540 may be communicatively linked to one or more servers 520 via one or more links 550. In particular embodiments, data storages 540 may be used to store various types of information. In particular embodiments, the information stored in data storages 540 may be organized according to specific data structures. In particular embodiment, each data storage 540 may be a relational database. Particular embodiments may provide interfaces that enable servers 520 or clients 530 to manage, e.g., retrieve, modify, add, or delete, the information stored in data storage 540.

In particular embodiments, each client 530 may be an electronic device including hardware, software, or embedded logic components or a combination of two or more such components and capable of carrying out the appropriate functions implemented or supported by client 530. For example and without limitation, a client 530 may be a desktop computer system, a notebook computer system, a netbook computer system, a handheld electronic device, or a mobile telephone. The present disclosure contemplates any suitable clients 530. A client 530 may enable a network user at client 530 to access network 530. A client 530 may enable its user to communicate with other users at other clients 530.

A client 530 may have a web browser 532, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at client 530 may enter a Uniform Resource Locator (URL) or other address directing the web browser 532 to a server 520, and the web browser 532 may generate a Hyper Text Transfer Protocol (HTTP) request and communicate the HTTP request to server 520. Server 520 may accept the HTTP request and communicate to client 530 one or more Hyper Text Markup Language (HTML) files responsive to the HTTP request. Client 530 may render a web page based on the HTML files from server 520 for presentation to the user. The present disclosure contemplates any suitable web page files. As an example and not by way of limitation, web pages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a web page encompasses one or more corresponding web page files (which a browser may use to render the web page) and vice versa, where appropriate.

Figure 6:
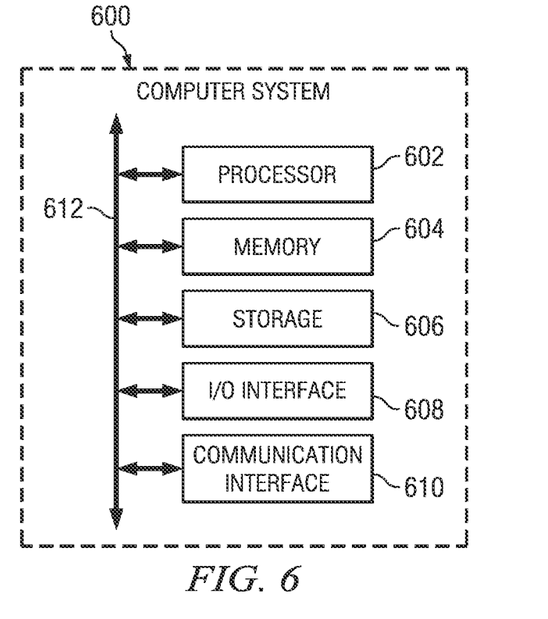
FIG. 6 illustrates an example computing system.

FIG. 6 illustrates an example computer system 600, which may be used with some embodiments of the present invention. This disclosure contemplates any suitable number of computer systems 600. This disclosure contemplates computer system 600 taking any suitable physical form. As example and not by way of limitation, computer system 600 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, computer system 600 may include one or more computer systems 600; be unitary or distributed; span multiple locations; span multiple machines; or reside in a cloud, which may include one or more cloud components in one or more networks. Where appropriate, one or more computer systems 600 may perform without substantial spatial or temporal limitation one or more steps of one or more methods described or illustrated herein. As an example and not by way of limitation, one or more computer systems 600 may perform in real time or in batch mode one or more steps of one or more methods described or illustrated herein. One or more computer systems 600 may perform at different times or at different locations one or more steps of one or more methods described or illustrated herein, where appropriate.

In particular embodiments, computer system 600 includes a processor 602, memory 604, storage 606, an input/output (I/O) interface 608, a communication interface 610, and a bus 612. Although this disclosure describes and illustrates a particular computer system having a particular number of particular components in a particular arrangement, this disclosure contemplates any suitable computer system having any suitable number of any suitable components in any suitable arrangement.

In particular embodiments, processor 602 includes hardware for executing instructions, such as those making up a computer program. As an example and not by way of limitation, to execute instructions, processor 602 may retrieve (or fetch) the instructions from an internal register, an internal cache, memory 604, or storage 606; decode and execute them; and then write one or more results to an internal register, an internal cache, memory 604, or storage 606. In particular embodiments, processor 602 may include one or more internal caches for data, instructions, or addresses. The present disclosure contemplates processor 602 including any suitable number of any suitable internal caches, where appropriate. As an example and not by way of limitation, processor 602 may include one or more instruction caches, one or more data caches, and one or more translation look-aside buffers (TLBs). Instructions in the instruction caches may be copies of instructions in memory 604 or storage 606, and the instruction caches may speed up retrieval of those instructions by processor 602. Data in the data caches may be copies of data in memory 604 or storage 606 for instructions executing at processor 602 to operate on; the results of previous instructions executed at processor 602 for access by subsequent instructions executing at processor 602 or for writing to memory 604 or storage 606; or other suitable data. The data caches may speed up read or write operations by processor 602. The TLBs may speed up virtual-address translation for processor 602. In particular embodiments, processor 602 may include one or more internal registers for data, instructions, or addresses. The present disclosure contemplates processor 602 including any suitable number of any suitable internal registers, where appropriate. Where appropriate, processor 602 may include one or more arithmetic logic units (ALUs); be a multi-core processor; or include one or more processors 602. Although this disclosure describes and illustrates a particular processor, this disclosure contemplates any suitable processor.

In particular embodiments, memory 604 includes main memory for storing instructions for processor 602 to execute or data for processor 602 to operate on. As an example and not by way of limitation, computer system 600 may load instructions from storage 606 or another source (such as, for example, another computer system 600) to memory 604. Processor 602 may then load the instructions from memory 604 to an internal register or internal cache. To execute the instructions, processor 602 may retrieve the instructions from the internal register or internal cache and decode them. During or after execution of the instructions, processor 602 may write one or more results (which may be intermediate or final results) to the internal register or internal cache. Processor 602 may then write one or more of those results to memory 604. In particular embodiments, processor 602 executes only instructions in one or more internal registers or internal caches or in memory 604 (as opposed to storage 606 or elsewhere) and operates only on data in one or more internal registers or internal caches or in memory 604 (as opposed to storage 606 or elsewhere). One or more memory buses (which may each include an address bus and a data bus) may couple processor 602 to memory 604. Bus 612 may include one or more memory buses, as described below. In particular embodiments, one or more memory management units (MMUs) reside between processor 602 and memory 604 and facilitate accesses to memory 604 requested by processor 602. In particular embodiments, memory 604 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. The present disclosure contemplates any suitable RAM. Memory 604 may include one or more memories 602, where appropriate. Although this disclosure describes and illustrates particular memory, this disclosure contemplates any suitable memory.

In particular embodiments, storage 606 includes mass storage for data or instructions. As an example and not by way of limitation, storage 606 may include an HDD, a floppy disk drive, flash memory, an optical disc, a magneto-optical disc, magnetic tape, or a Universal Serial Bus (USB) drive or a combination of two or more of these. Storage 606 may include removable or non-removable (or fixed) media, where appropriate. Storage 606 may be internal or external to computer system 600, where appropriate. In particular embodiments, storage 606 is non-volatile, solid-state memory. In particular embodiments, storage 606 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 606 taking any suitable physical form. Storage 606 may include one or more storage control units facilitating communication between processor 602 and storage 606, where appropriate. Where appropriate, storage 606 may include one or more storages 606. Although this disclosure describes and illustrates particular storage, this disclosure contemplates any suitable storage.

In particular embodiments, I/O interface 608 includes hardware, software, or both providing one or more interfaces for communication between computer system 600 and one or more I/O devices. Computer system 600 may include one or more of these I/O devices, where appropriate. One or more of these I/O devices may enable communication between a person and computer system 600. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 608 for them. Where appropriate, I/O interface 608 may include one or more device or software drivers enabling processor 602 to drive one or more of these I/O devices. I/O interface 608 may include one or more I/O interfaces 608, where appropriate. Although this disclosure describes and illustrates a particular I/O interface, this disclosure contemplates any suitable I/O interface.

In particular embodiments, communication interface 610 includes hardware, software, or both providing one or more interfaces for communication (such as, for example, packet-based communication) between computer system 600 and one or more other computer systems 600 or one or more networks. As an example and not by way of limitation, communication interface 610 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 610 for it. As an example and not by way of limitation, computer system 600 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 600 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 600 may include any suitable communication interface 610 for any of these networks, where appropriate. Communication interface 610 may include one or more communication interfaces 610, where appropriate. Although this disclosure describes and illustrates a particular communication interface, this disclosure contemplates any suitable communication interface.

In particular embodiments, bus 612 includes hardware, software, or both coupling components of computer system 600 to each other. As an example and not by way of limitation, bus 612 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCI-X) bus, a serial advanced technology attachment (SATA) bus, a Video Electronics Standards Association local (VLB) bus, or another suitable bus or a combination of two or more of these. Bus 612 may include one or more buses 612, where appropriate. Although this disclosure describes and illustrates a particular bus, this disclosure contemplates any suitable bus or interconnect.

Figure 7:
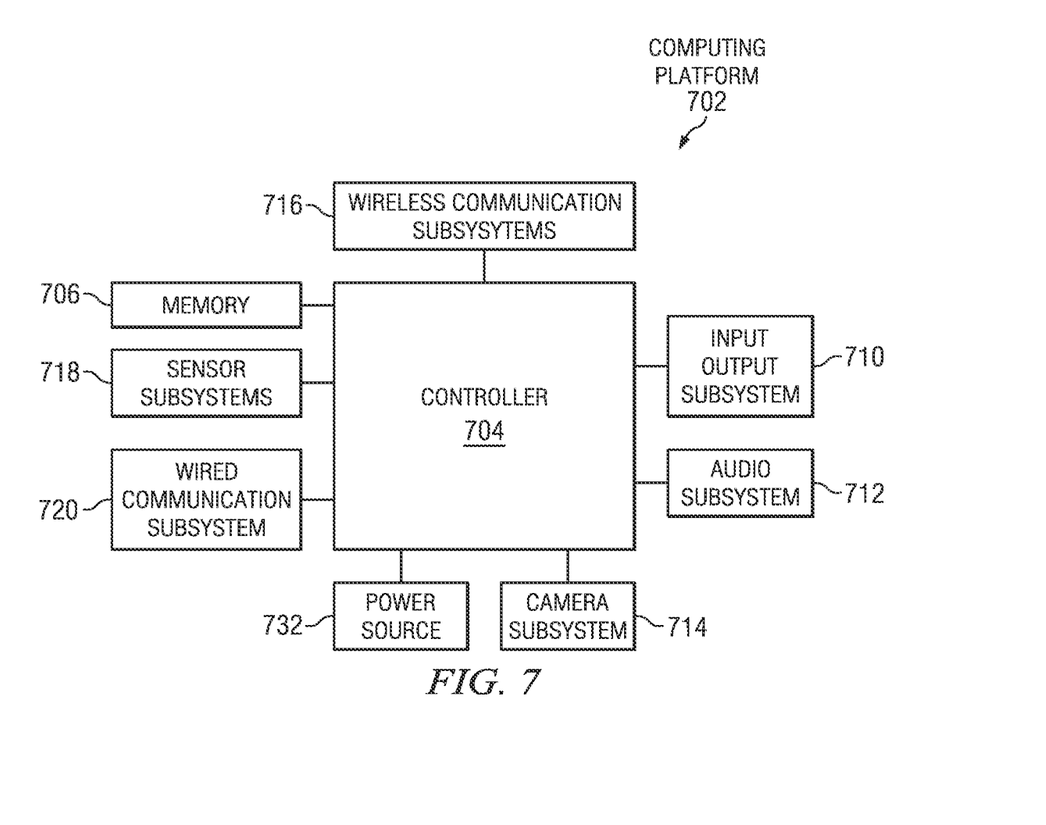
FIG. 7 illustrates an example mobile device.

The client-side functionality described above can be implemented as a series of instructions stored on a computer-readable storage medium that, when executed, cause a programmable processor to implement the operations described above. While the client device 122 may be implemented in a variety of different hardware and computing systems, FIG. 7 shows a schematic representation of the main components of an example computing platform 702, according to various particular embodiments. Multipoint sensing devices generally include a controller 704 which may comprise a microcontroller or one or more processors configured to execute instructions and to carry out operations associated with a computing platform. In various embodiments, controller 704 may be implemented as a single-chip, multiple chips and/or other electrical components including one or more integrated circuits and printed circuit boards. Controller 704 may optionally contain a cache memory unit for temporary local storage of instructions, data, or computer addresses. By way of example, using instructions retrieved from memory, controller 704 may control the reception and manipulation of input and output data between components of computing platform 702.

Controller 704 together with a suitable operating system may operate to execute instructions in the form of computer code and produce and use data. By way of example and not by way of limitation, the operating system may be Windows-based, Mac-based, or Unix or Linux-based, or Symbian-based, among other suitable operating systems. The operating system, other computer code (including control client 708 described below) and/or data may be physically stored within a memory block 706 that is operatively coupled to controller 704.

Memory block 706 encompasses one or more storage media and generally provides a place to store computer code (e.g., software and/or firmware) and data that are used by the computing platform 702. By way of example, memory block 706 may include various tangible computer-readable storage media including Read-Only Memory (ROM) and/or Random-Access Memory (RAM). As is well known in the art, ROM acts to transfer data and instructions uni-directionally to controller 704, and RAM is used typically to transfer data and instructions in a bi-directional manner. Memory block 706 may also include one or more fixed storage devices in the form of, by way of example, solid-state hard disk drives (HDDs), among other suitable forms of memory coupled bi-directionally to controller 704. Information may also reside on a removable storage medium loaded into or installed in multipoint sensing devices when needed. By way of example, any of a number of suitable memory cards may be loaded into computing platform 702 on a temporary or permanent basis.

Controller 704 is also generally coupled to a variety of interfaces such as graphics control, video interface, input interface, output interface, and storage interface, and network interface, and these interfaces in turn are coupled to the appropriate devices. In certain embodiment, Controller 704 may connected to an input structure 714 and display 716 may be provided together, such an in the case of a touch-screen where a touch sensitive mechanism is provided in conjunction with the display 716. In such embodiments, the user may select or interact with displayed interface elements via the touch sensitive mechanism. In this way, the displayed interface may provide interactive functionality, allowing a user to navigate the displayed interface by touching the display 716.

Electric signals (e.g., analog) may be produced by microphone 710 and fed to earpiece 712. Controller 704 may receive instruction signals from input structure 714 and control the operation of display 716. By way of example, display 716 may incorporate liquid crystal display (LCD), light emitting diode (LED), Interferometric modulator display (IMOD), or any other suitable display technology. Audio signals may be transmitted and received by means of an antenna 718 that may be connected through a radio interface 720 or audio input interface such as microphone 724 to codec 722 configured to process signals under control of controller 704. Additionally, multipoint sensing devices may be powered power source 732.

Mobile device may also include one or more user input devices 734 (other than input structure 714) that are operatively coupled to the controller 704. Generally, input devices 734 are configured to transfer data, commands and responses from the outside world into multipoint sensing devices. By way of example, mobile device may include a keyboard or mouse. Input devices 734 may also include one or more hard buttons.

Display device 716 is generally configured to display a graphical user interface (GUI) that provides an easy to use visual interface between a user of the computing platform 702 and the operating system or application(s) running on the mobile device. Generally, the GUI presents programs, files and operational options with graphical images. During operation, the user may select and activate various graphical images displayed on the display 716 in order to initiate functions and tasks associated therewith.

Herein, reference to a computer-readable storage medium encompasses one or more non-transitory, tangible computer-readable storage media possessing structure. As an example and not by way of limitation, a computer-readable storage medium may include a semiconductor-based or other integrated circuit (IC) (such, as for example, a field-programmable gate array (FPGA) or an application-specific IC (ASIC)), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, or another suitable computer-readable storage medium or a combination of two or more of these, where appropriate. Herein, reference to a computer-readable storage medium excludes any medium that is not eligible for patent protection under 35 U.S.C. § 101. Herein, reference to a computer-readable storage medium excludes transitory forms of signal transmission (such as a propagating electrical or electromagnetic signal per se) to the extent that they are not eligible for patent protection under 35 U.S.C. § 101.

This disclosure contemplates one or more computer-readable storage media implementing any suitable storage. In particular embodiments, a computer-readable storage medium implements one or more portions of processor 602 (such as, for example, one or more internal registers or caches), one or more portions of memory 604, one or more portions of storage 606, or a combination of these, where appropriate. In particular embodiments, a computer-readable storage medium implements RAM or ROM. In particular embodiments, a computer-readable storage medium implements volatile or persistent memory. In particular embodiments, one or more computer-readable storage media embody software. Herein, reference to software may encompass one or more applications, bytecode, one or more computer programs, one or more executables, one or more instructions, logic, machine code, one or more scripts, or source code, and vice versa, where appropriate. In particular embodiments, software includes one or more application programming interfaces (APIs). This disclosure contemplates any suitable software written or otherwise expressed in any suitable programming language or combination of programming languages. In particular embodiments, software is expressed as source code or object code. In particular embodiments, software is expressed in a higher-level programming language, such as, for example, C, Perl, or a suitable extension thereof. In particular embodiments, software is expressed in a lower-level programming language, such as assembly language (or machine code). In particular embodiments, software is expressed in JAVA. In particular embodiments, software is expressed in Hyper Text Markup Language (HTML), Extensible Markup Language (XML), or other suitable markup language.

The present disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend.

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure. For example, although the foregoing embodiments have been described in the context of a social network system, it will apparent to one of ordinary skill in the art that the invention may be used with any electronic social network service and, even if it is not provided through a website. Any computer-based system that provides social networking functionality can be used in accordance with the present invention even if it relies, for example, on e-mail, instant messaging or other form of peer-to-peer communications, and any other technique for communicating between users. The invention is thus not limited to any particular type of communication system, network, protocol, format or application.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a tangible computer readable storage medium or any type of media suitable for storing electronic instructions, and coupled to a computer system bus. Furthermore, any computing systems referred to in the specification may include a single processor or may be architectures employing multiple processor designs for increased computing capability.

While the foregoing processes and mechanisms can be implemented by a wide variety of physical systems and in a wide variety of network and computing environments, the server or computing systems described below provide example computing system architectures for didactic, rather than limiting, purposes.

The present invention has been explained with reference to specific embodiments. For example, while embodiments of the present invention have been described as operating in connection with a social network system, the present invention can be used in connection with any communications facility that allows for communication of messages between users, such as an email hosting site. Other embodiments will be evident to those of ordinary skill in the art. It is therefore not intended that the present invention be limited, except as indicated by the appended claims.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method comprising:
   by a first client device associated with a first user, receiving incoming communications wherein the incoming communications are sent by second client devices associated with second users;
   by the first client device, sending data associated with the incoming communications to a social-networking system, the social-networking system being operable to aggregate communications between the second users and the first user into conversations between the second users and the first user based at least in part on the data from the first client device, wherein the conversations comprise aggregated communications in one or more visual communication types and one or more non-visual communication types among a subset of users of the second users and the first user, wherein a non-visual communication is represented by a log data;
   wherein each conversation is associated with a subset of second users involved in the aggregate communications of the conversation;

by the first client device, querying the social-networking system to request the conversations between the second users and the first user;

by the first client device, receiving from the social-networking system:

the set of conversations;

the aggregated communications belonging to each received conversation between the first user and the subset of second users associated with each conversation, wherein each communication of the aggregated communications comprises an identifier indicating a type of the communication, and at least a portion of a profile associated with the second users in the social-networking system; and wherein aggregate communications associated with at least one of the received conversations is arranged, by the social networking system, based on an importance value associated with each aggregate communication, and wherein the importance value is determined based on a security framework applied to each communication;

by the first client device, displaying a selectable listing of the received conversations in a screen of the first client device, wherein each listing includes display of the subset of second users associated with each conversation;

in response to a selection of an element of the listing of conversations, by the first client device, displaying the aggregated communications and the portion of the profile in the screen of the first client device, wherein the communications between the first client device with the social-networking system occurs over a network.

2. The method of claim 1, wherein the aggregate communications received by the first client device comprise one or more voice-over-IP calls.

3. The method of claim 1, wherein the aggregate communications received by the first client device comprise one or more video chats.

4. The method of claim 1, wherein the aggregate communications received by the first client device comprise one or more voicemails.

5. The method of claim 4, wherein the voicemails are transcribed to text.

6. The method of claim 1, wherein one or more of the aggregate communications received by the first client device occurred within the social-networking system.

7. The method of claim 1, further comprising, by the first client device, generating log data based on the incoming communication.

8. The method of claim 7, further comprising, by the first client device, sending the log data to the social-networking system, the social-networking system being operable to aggregate communications between the second user and the first user based at least in part on log data.

9. The method of claim 1, wherein the aggregate communications received by the first client device comprise one or more SMS or MMS messages.

10. The method of claim 1, wherein the aggregate communications received by the first client device comprise one or more e-mails.

11. The method of claim 1, wherein the social-networking system comprises a social graph, the social graph comprising one or more nodes, a first one of the nodes being associated with the second user, a second one of the nodes being associated with the first user.

12. A non-transitory computer-readable storage media comprising instructions operable, when executed by one or more processors of a first client device associated with a first user, to:

receive incoming communications, wherein the incoming communications are sent by second client devices associated with second users;

send data associated with the incoming communications to a social-networking system, the social-networking system being operable to aggregate communications between the second users and the first user into conversations between the second users and the first user based at least in part on the data from the first client device, wherein the conversations comprise aggregated communications in one or more visual communication types and one or more non-visual communication types among a subset of users of the second users and the first user, wherein a non-visual communication is represented by a log data;

wherein each conversation is associated with a subset of second users involved in the aggregate communications of the conversation;

query the social-networking system to request the conversations between the second users and the first user;

receive from the social-networking system:

the set of conversations;

the aggregated communications belonging to each received conversation between the first user and the subset of second users associated with each conversation, wherein each communication of the aggregated communications comprises an identifier indicating a type of the communication, and at least a portion of a profile associated with the second users in the social-networking system; and wherein aggregate communications associated with at least one of the received conversations is arranged, by the social networking system, based on an importance value associated with each aggregate communication, and wherein the importance value is determined based on a security framework applied to each communication;

display a selectable listing of the received conversations in a screen of the first client device, wherein each listing includes display of the subset of second users associated with each conversation;

in response to a selection of an element of the listing of conversations, displaying the aggregated communications and the portion of the profile in the screen of the first client device, wherein the communications between the first client device with the social-networking system occurs over a network.

13. The media of claim 12, wherein the aggregate communications received by the first client device comprise one or more voice-over-IP calls.

14. The media of claim 12, wherein the aggregate communications received by the first client device comprise one or more video chats.

15. The media of claim 12, wherein the aggregate communications received by the first dent device comprise one or more voicemails.

16. The media of claim 12, wherein one or more of the aggregate communications received by the first client device occurred within the social-networking system.

17. The media of claim 12, further comprising instructions operable, when executed by one or more processors of the first client device, to generate log data based on the incoming communication.

18. The media of claim 17, further comprising instructions operable, when executed by one or more processors of the first client device, to send the log data to the social-networking system, the social-networking system being operable to aggregate communications between the second user and the first user based at least in part on the log data.

19. The media of claim 12, wherein the aggregate communications received by the first client device comprise one or more e-mails.

20. A first client device associated with a first user and comprising one or more processors and a memory coupled to the processors, the memory comprising instructions executable by the processors, the processor being operable when executing the instructions to:
- receive incoming communications, wherein the incoming communications are sent by second client devices associated with second users;
- send data associated with the incoming communications to a social-networking system, the social-networking system being operable to aggregate communications between the second users and the first user into conversations between the second users and the first user based at least in part on the data from the first client device, wherein the conversations comprise aggregated communications in one or more visual communication types and one or more non-visual communication types among a subset of users of the second users and the first user, wherein a non-visual communication is represented by a log data;
- wherein each conversation is associated with a subset of second users involved in the aggregate communications of the conversation;
- query the social-networking system to request the conversations between the second users and the first user;
- receive from the social-networking system:
- the set of conversations;
- the aggregated communications belonging to each received conversation between the first user and the subset of second users associated with each conversation, wherein each communication of the aggregated communications comprises an identifier indicating a type of the communication, and at least a portion of a profile associated with the second users in the social-networking system; and
- wherein aggregate communications associated with at least one of the received conversations is arranged, by the social networking system, based on an importance value associated with each aggregate communication, and wherein the importance value is determined based on a security framework applied to each communication;
- display a selectable listing of the received conversations in a screen of the first client device, wherein each listing includes display of the subset of second users associated with each conversation;
- in response to a selection of an element of the listing of conversations, displaying the aggregated communications and the portion of the profile in the screen of the first client device,
- wherein the communications between the first client device with the social-networking system occurs over a network.

* * * * *